(12) United States Patent
Sasaki et al.

(10) Patent No.: US 11,472,716 B2
(45) Date of Patent: Oct. 18, 2022

(54) HIGH-PURITY BARIUM TITANATE POWDER, METHOD FOR PRODUCING SAME, RESIN COMPOSITION, AND FINGERPRINT SENSOR

(71) Applicant: DENKA COMPANY LIMITED, Tokyo (JP)

(72) Inventors: Shuji Sasaki, Fukuoka (JP); Yuzo Nakamura, Fukuoka (JP); Noriyuki Kashiwamura, Fukuoka (JP); Kazutoshi Sugita, Fukuoka (JP)

(73) Assignee: DENKA COMPANY LIMITED, Tokyo (JP)

( * ) Notice: Subject to any disclaimer, the term of this patent is extended or adjusted under 35 U.S.C. 154(b) by 66 days.

(21) Appl. No.: 16/309,760

(22) PCT Filed: May 31, 2017

(86) PCT No.: PCT/JP2017/020302
§ 371 (c)(1),
(2) Date: Dec. 13, 2018

(87) PCT Pub. No.: WO2017/217235
PCT Pub. Date: Dec. 21, 2017

(65) Prior Publication Data
US 2019/0135651 A1 May 9, 2019

(30) Foreign Application Priority Data
Jun. 14, 2016 (JP) .............................. JP2016-118026

(51) Int. Cl.
| | | |
|---|---|---|
| *C01G 23/00* | (2006.01) | |
| *C09K 3/10* | (2006.01) | |
| *C08L 101/00* | (2006.01) | |
| *C08K 3/22* | (2006.01) | |
| *C08K 7/18* | (2006.01) | |
| *G06V 40/12* | (2022.01) | |

(52) U.S. Cl.
CPC ........... *C01G 23/006* (2013.01); *C01G 23/00* (2013.01); *C08K 3/22* (2013.01); *C08K 7/18* (2013.01); *C08L 101/00* (2013.01); *C09K 3/10* (2013.01); *C01P 2004/32* (2013.01); *C01P 2004/61* (2013.01); *C01P 2006/40* (2013.01); *C01P 2006/80* (2013.01); *C08K 2003/2206* (2013.01); *C08K 2003/2237* (2013.01); *C08K 2201/001* (2013.01); *C08K 2201/003* (2013.01); *C08K 2201/004* (2013.01); *C08K 2201/005* (2013.01); *G06V 40/12* (2022.01)

(58) Field of Classification Search
CPC ........... C04B 35/4682; C04B 35/6262; G06K 9/0002; C01F 11/00; C01G 23/00
USPC ........................................... 382/124; 423/598
See application file for complete search history.

(56) References Cited

U.S. PATENT DOCUMENTS

| | | | |
|---|---|---|---|
| 5,900,223 A | 5/1999 | Matijevic et al. | |
| 7,402,337 B2* | 7/2008 | Takaya | ............... C04B 35/6262 428/403 |
| 2002/0191820 A1* | 12/2002 | Kim | ..................... G06K 9/0002 382/124 |
| 2002/0197461 A1* | 12/2002 | Takaya | .................... C30B 11/00 428/210 |
| 2004/0028601 A1 | 2/2004 | Torii et al. | |
| 2004/0213730 A1* | 10/2004 | Swanson | ............. C04B 35/4682 423/598 |
| 2010/0092375 A1 | 4/2010 | Fukazawa | |

FOREIGN PATENT DOCUMENTS

| | | | | |
|---|---|---|---|---|
| CN | 1472141 A | | 2/2004 | |
| CN | 101333000 A | * | 12/2008 | .............. C01F 11/00 |
| JP | 61220446 A | | 9/1986 | |
| JP | 07232923 A | | 9/1995 | |
| JP | 2003252623 A | | 9/2003 | |
| JP | 2003277562 A | | 10/2003 | |
| JP | 2004182478 A | | 7/2004 | |
| JP | 2004-256821 | * | 9/2004 | ............. B32B 27/18 |
| JP | 2006273697 A | | 10/2006 | |
| JP | 2007261912 A | | 10/2007 | |
| JP | 2008-133162 A | * | 6/2008 | ............. C01G 23/00 |
| JP | 200945923 A | | 3/2009 | |
| WO | 2008102785 A1 | | 8/2008 | |
| WO | 2015146816 A1 | | 10/2015 | |

OTHER PUBLICATIONS

English Abstract for JP 61220446 A (1986).
English Abstract for JP 2003277562 A (2003).
English Abstract for JP 2004182478 A (2004).
English Abstract for JP 2006273697 A (2006).
English Abstract for JP 2007261912 A (2007).
English Abstract for JP 200945923 A (2009).
Magnone et al. (2016). The effect of the hydrothermal synthesis variables on barium titanate powders. Ceramics International, 42, 10030-10036.
Machine Translation of CN 1472141 A (2004).
Translation of Japanese Office Action dated Aug. 31, 2021.
https://www.nippon-chem.co.jp/en/en_research_development/en_introduction/en_pal_serum_bt.html, accessed Sep. 14, 2021.

* cited by examiner

*Primary Examiner* — Khanh T Nguyen
(74) *Attorney, Agent, or Firm* — Caesar Rivise, PC

(57) ABSTRACT

A high-purity barium titanate powder according to the present invention has a $Cl^-$ concentration of 20 ppm or less, an electric conductivity of extracted water of 70 μS/cm or less, and an average particle diameter of 1 μm to 30 μm.

4 Claims, No Drawings

HIGH-PURITY BARIUM TITANATE POWDER, METHOD FOR PRODUCING SAME, RESIN COMPOSITION, AND FINGERPRINT SENSOR

CROSS-REFERENCE TO RELATED APPLICATIONS

This application is the U.S. National Phase Application of PCT/JP2017/020302, filed May 31, 2017, which claims priority from JP 2016-118026 filed Jun. 14, 2016, the contents of which applications are incorporated herein by reference in their entireties for all purposes.

TECHNICAL FIELD

The present invention relates to a high-purity barium titanate powder, a method for producing the same, a resin composition, and a fingerprint sensor.

BACKGROUND ART

Recently, digitization and networking of information are greatly advanced, and management of confidential information of companies and individuals becomes important. In access management to confidential information, a person authentication function is required, and fingerprint authentication is currently widespread in fields requiring advanced personal identification functions.

The fingerprint authentication includes optical type, thermal type and electrostatic capacitance type fingerprint authentication or the like. In mobile terminals represented by smartphones and tablets, the electrostatic capacitance type fingerprint authentication is adopted in many cases, in terms of high reliability, high resolution and miniaturization. The electrostatic capacitance type fingerprint authentication requires accurate detection of a difference in electrostatic capacitance due to delicate irregularities of a fingerprint. Therefore, to improve the detection accuracy of the electrostatic capacitance type fingerprint authentication system, there is a need for higher dielectric constant of a sealing portion for protecting a fingerprint sensor. For example, to detect accurately the fingerprint sensor at a general sensitivity level, the sealing portion is required for having a relative dielectric constant of 30 or more.

On the other hand, recently, demand for cost reduction of electronic component devices has become severe, and inexpensive copper has been used in place of gold, as a material for a bonding wire and the like.

However, electronic component devices including copper wires tend to cause problems that migration and corrosion are generated due to prolonged use, or the like. Therefore, there is a need for a sealing material having improved long-term reliability.

As a sealing material used for forming the sealing portion, a resin composition containing a filler is generally known. To increase the dielectric constant of the sealing portion, a high dielectric material such as barium titanate is preferably used as a filler. In this case, it is important for an amount of ionic impurities eluted to be as low as possible, in order to ensure the long-term reliability of the sealing portion of the high dielectric material used as the filler. Furthermore, the sealing material is also required for having a property of being sealable with low viscosity so as not to damage wires on a chip.

However, barium titanate has a problem that the long-term reliability of the sealing portion is lowered because chlorine-based or sulfur-based ionic impurities originating from a raw material remain in its producing process.

In view of the foregoing, Patent Document 1 proposes a method for producing a barium titanate powder with a lower impurity content, by a hydrothermal synthesis method using a titanium compound and a barium compound, in which a pH of the titanium compound, a chlorine content in the titanium compound and/or concentrations of the titanium compound and the barium compound are controlled.

CITATION LIST

Patent Document
Patent Document 1: Japanese Patent Application Publication No. 2007-261912 A

SUMMARY OF INVENTION

Technical Problem

However, Patent Document 1 does not particularly mention the concentration of ionic impurities such as chlorine ions eluted from the produced barium titanate powder. Further, Patent Document 1 uses a titanium compound containing at least 100 ppm (0.01 wt %) of chloride ion ($Cl^-$) as a raw material. Therefore, when the produced barium titanate powder is used as a filler for the sealing material, the long-term reliability of the sealing part would be lowered. As described above, under circumstances of the conventional techniques, a barium titanate powder is not obtained yet which has characteristics suitable for producing a sealing material with low viscosity, which can form a high dielectric constant sealing portion having improved long-term reliability.

The present invention has been made to solve the above problems. An object of the present invention is to provide a barium titanate powder capable of producing a sealing material with low viscosity, which can form a high dielectric constant sealing portion having improved long-term reliability, and to provide a method for producing the same. Another object of the present invention is to provide a resin composition suitable for use as a sealing material with low viscosity, which can form a high dielectric constant sealing portion having improved long-term reliability.

A further object of the present invention is to provide a fingerprint sensor having improved long-term reliability and high detection accuracy.

Solution to Problem

The present inventors have conducted extensive research in order to achieve the above objects. As a result, the present inventors have found a high-purity barium titanate powder that achieves the objects and have completed the present invention.

Thus, the present invention relates to a high-purity barium titanate powder having a $Cl^-$ concentration of 20 ppm or less, an electric conductivity of extracted water of 70 μS/cm or less, and an average particle diameter of 1 μm to 30 μm.

The present invention also relates to a method for producing a high-purity barium titanate powder, comprising: introducing ion exchanged water having an electric conductivity of 10 μS/cm or less and a barium titanate powder into a processing vessel comprising a circulation line, and circulating the ion exchanged water and the barium titanate powder while ultrasonic-dispersing them using a sound wave generator installed in the circulation line, thereby extracting ionic impurities contained in the barium titanate powder into the ion exchanged water to decrease the ionic impurities.

Further, the present invention relates to a resin composition comprising the high-purity barium titanate powder as described above.

Furthermore, the present invention relates a fingerprint sensor comprising at least one sealing portion made of a cured product of the resin composition as described above.

Advantageous Effects of Invention

According to the present invention, it is possible to provide a barium titanate powder capable of producing a sealing material with low viscosity, which can form a high dielectric constant sealing portion having improved long-term reliability, and a method for producing the same.

Further, according to the present invention, it is possible to provide a resin composition suitable for use as a sealing material with low viscosity, which can form a high dielectric constant sealing portion having improved long-term reliability.

Furthermore, according to the present invention, it is possible to provide a fingerprint sensor having improved long-term reliability and high detection accuracy.

DESCRIPTION OF THE PREFERRED EMBODIMENTS

Hereinafter, the present invention will be described in detail.

A high-purity barium titanate powder according to the present invention requires a $Cl^-$ (chloride ion) concentration of 20 ppm or less. If the $Cl^-$ concentration is more than 20 ppm, a bonding material such as a copper wire will tend to corrode when a chip is sealed with a sealing material containing the high-purity barium titanate powder. The sealing portion formed of such a sealing material will deteriorate, in particular, high-temperature storage characteristics, so that long-term reliability cannot be sufficiently ensured. The $Cl^-$ concentration of the high-purity barium titanate powder is preferably 10 ppm or less, and more preferably 5 ppm or less.

The $Cl^-$ concentration of the high-purity barium titanate powder according to the present invention is measured by the following method using ion chromatography.

First, 10 g of sample powder (the high-purity barium titanate powder) and 70 mL of ion exchanged water are placed in a polyethylene container and shaken for 1 minute. The resulting mixture is then placed in a dryer, dried at 95° C. for 20 hours, and then cooled. Ion-exchanged water corresponding to the evaporated fraction is then added to the mixture to bring about a defined amount, and then centrifuged. The resulting supernatant is taken in a beaker to prepare a test solution. In addition to the sample solution, the same procedure as described above is carried out with the exception that sample powder is not used, to prepare a sample solution for a blank test.

A part of the sample solution is then measured by ion chromatography, and a $Cl^-$ concentration is determined from a calibration curve prepared in advance. The same measurement is also carried out for the sample solution for blank test to correct the result of the sample solution.

Here, for the ion chromatography, "ICS-1500" available from DIONEX Corporation was used. For the preparation of the calibration curve, a $Cl^-$ standard solution (a concentration of 1000 ppm) for ion chromatography from KANTO KAGAKU was used.

The high-purity barium titanate powder according to the present invention requires an electric conductivity of extracted water of 70 μS/cm or less. When the electric conductivity of extracted water is more than 70 μS/cm, the amount of impurities eluted from the high-purity barium titanate powder to a resin component in a sealing material will be increased, so that curability of the sealing material will be lowered. Therefore, the long-term reliability of the sealing portion formed of the sealing material cannot be sufficiently ensured. The electric conductivity of extracted water of the high-purity barium titanate powder is preferably 50 μS/cm or less, and more preferably 30 μS/cm or less.

The electrical conductivity of extracted water of the high-purity barium titanate powder according to the present invention is measured by the following method using an electric conductivity meter "CM-30R" and an electric conductivity cell "CT-57101C" available from DKK-TOA CORPORATION.

First, 30 g of sample powder (the high-purity barium titanate powder) is placed in a 300 mL polyethylene container, and 142.5 mL of ion exchange water having an electric conductivity of 1 μS/cm or less and 7.5 mL of ethanol having a purity of 99.5% or more are then added and shaken for 10 minutes with a reciprocal shaking method using "Double Action Labshaker SRR-2" available from AS ONE Corporation, and then left for 30 minutes. The electric conductivity cell is immersed in the sample solution thus obtained, and a value read after 1 minute is determined to be the electric conductivity of extracted water. It should be noted that the electric conductivity of the ion exchanged water is a value obtained by adding 150 mL of ion exchanged water to the 300 mL polyethylene container, immersing the electric conductivity cell in the ion exchanged water and then reading a value after 1 minute.

The high-purity barium titanate powder according to the present invention requires an average particle diameter of 1 μm to 30 μm. When the average particle diameter is less than 1 μm, the viscosity of the sealing material containing the high-purity barium titanate powder will be increased, so that a risk of deformation of a wire will be increased when a chip is sealed. On the other hand, when the average particle diameter is more than 30 μm, coarse particles (the high-purity barium titanate powder) will be increased, and the frequency of collision of these coarse particles with the wire will be increased, so that a risk of deformation of the wire will be increased. The average particle diameter of the high-purity barium titanate powder is preferably 2 μm to 25 μm, and more preferably 3 μm to 20 μm.

The average particle diameter of the high-purity barium titanate powder according to the present invention is a value based on particle diameter measurement on mass basis by means of a laser diffraction light scattering method, and measured using "Mastersizer 3000, wet dispersion unit: Hydro MV attached" from Malvern Panalytical Ltd. In the measurement, water is used as a solvent, and a dispersing treatment is carried out as a pretreatment over 2 minutes by applying an output of 200 W using "Ultrasonic Generator UD-200 (equipped with a microchip TP-040)" from TOMMY SEIKO CO., LTD. A sample powder after the dispersing treatment is dropped to the dispersion unit such that a laser scattering intensity is from 10 to 15%. A stirring speed of the dispersion unit stirrer is 1750 rpm, with no ultrasonic mode. The analysis of the particle size distribution is carried out by dividing a range of the particle diameter of from 0.01 to 3500 μm into 100 parts. A refractive index of water of 1.33 is used and a refractive index of the barium titanate powder of 2.40 is used. It should be noted that in the measured particle size distribution, particles whose cumulative mass is 50% is the average particle diameter.

The high-purity barium titanate powder according to the present invention preferably has an average sphericity of particles with a particle diameter of 2 μm or more of 0.80 or more. A higher average sphericity of the high-purity barium titanate will have a lower viscosity of the sealing material containing the high-purity barium titanate powder, so that deformation of a wire during sealing can be reduced. The average sphericity of particles with a particle diameter of 2 μm or more is more preferably 0.83 or more. Further, when the high-purity barium titanate powder according to the present invention has an excessively low sphericity of particles with a particle diameter of 2 μm or more, irregularities on the particle surface will be increased, which will significantly affect the deformation of the wire. Therefore, preferably, in the particles with a particle diameter of 2 μm or more, a percentage of a number of particles having a sphericity of more than 0.70 and 0.75 or less is 10.0% or less, and a percentage of a number of particles having a sphericity of 0.70 or less is 10.0% or less. More preferably, in the particles with a particle diameter of 2 μm or more, a percentage of a number of particles having a sphericity of more than 0.70 and 0.75 or less is 8.0% or less, and a percentage of a number of particles having a sphericity of 0.70 or less is 7.0% or less.

The sphericity of the high-purity barium titanate powder according to the present invention is measured by the following method.

First, a sample powder (the high-purity barium titanate powder) and ethanol are mixed to prepare a slurry having a content of high-purity barium titanate powder of 1% by mass, and the slurry is then subjected to a dispersing treatment using "SONIFIER 450 (crushing horn ¾" solid type)" for 2 minutes at an output level of 8. The resulting dispersed slurry is then dropped with a spuit onto a sample table coated with a carbon paste. After leaving the dispersed slurry dropped on the sample table in the atmosphere until the slurry is dried, osmium coating is performed thereon, and the resulting film is photographed at a magnification of 3000 times using a scanning electron microscope "JSM-6301F model" from JEOL Ltd. A photographed image having resolution of 2048×1536 pixels is fetched into a personal computer. The particles in the image is recognized with an easy-fetching tool using an image analyzer "MacView Ver. 4" from MOUNTECH CO. LTD., and a sphericity is measured from a projected area (A) and a perimeter (PM) of each particle. Here, when an area of a perfect circle corresponding to the perimeter (PM) is defined as (B), the sphericity of the particle is A/B. Therefore, assuming a perfect circle (radius r) having the same perimeter as the perimeter (PM) of the sample, $PM=2\pi r$, and $B=\pi r^2$, and as a result, $B=\pi \times (PM/2\pi)^2$. The sphericity of each particle is given by the equation: sphericity=$A/B=A \times 4\pi/(PM)^2$. The sphericity of arbitrary 200 particles thus obtained, which have a diameter corresponding to the projected area circle of 2 μm or more, is determined, and an average value thereof is determined to be the average sphericity. Further, the percentage of the number of each particle is calculated from the number of particles having a sphericity of more than 0.70 and 0.75 or less and the number of particles having a sphericity of 0.70 or less in the 200 particles.

The barium titanate powder used for producing the high-purity barium titanate powder according to the present invention may be produced by any method. In particular, the barium titanate powder is preferably produced by spraying a barium titanate raw material onto a field where a temperature range equal to or higher than the melting point of barium titanate is formed, and forming the raw material into a spheroidal shape by melting and softening to produce the barium titanate powder, in order to control the average particle diameter and the sphericity to those defined in the present invention.

A high purification method of the high-purity barium titanate powder according to the present invention will be described.

The high-purity barium titanate powder according to the present invention is preferably produced using a high purification method in which ion exchanged water having an electric conductivity of 10 μS/cm or less and a barium titanate powder is introduced into a processing vessel provided with a circulation line, and the ion exchanged water and the barium titanate powder are circulated while ultrasonic-dispersing them using a sound wave generator installed in the circulation line, thereby extracting ionic impurities contained in the barium titanate powder into the ion exchanged water to decrease the ionic impurities. The operation of the ultrasonic device in the ion exchanged water can allow a crushing effect by ultrasonic waves, and continuous irradiation with ultrasonic waves during circulation can allow efficient extraction of or contained in the barium titanate powder into the ion exchanged water.

The ultrasonic wave generator used for the high purification method includes, but not particularly limited to, preferably an ultrasonic homogenizer, in terms of high output and continuous operation. Further, the maximum output of the ultrasonic wave generator is preferably 200 W or more.

An electric conductivity of the ion exchanged water used for the above purification method is 10 μS/cm or less. If the ion conductivity of the ion exchanged water is more than 10 μS/cm, the effect of reducing the electric conductivity of extracted water of the barium titanate powder will be decreased. The electric conductivity of the ion exchange water may preferably be 5 μS/cm or less, and more preferably 3 μS/cm or less. The electric conductivity of the ion exchanged water is measured in the same procedure as the measurement method using the electric conductivity meter and the electric conductivity cell.

When the high-purity barium titanate powder according to the present invention is used for a sealing material, the high-purity titanate powder should have a crystal composition to such an extent that a sealing portion formed from the sealing material can exert high dielectric constant characteristic. Therefore, it is preferable that the high-purity barium titanate powder according to the present invention has a crystal composition having 75% or more of barium titanate. Further, the crystal structure of barium titanate is preferably tetragonal, which will be ferroelectric.

Since the high-purity barium titanate powder according to the present invention has the above characteristics, it is suitable for use as a filler for a sealing material. By using the high-purity barium titanate powder according to the present invention as a filler for a sealing material, a sealing material with low viscosity, which can form a high dielectric constant sealing portion having improved long-term reliability can be produced.

A resin composition according to the present invention contains the high-purity barium titanate powder according to the present invention. The content of the barium titanate powder in the resin composition is not particularly limited, and it may preferably be from 10% by mass to 95% by mass, and more preferably from 30% by mass to 93% by mass.

In the resin composition according to the present invention, the high-purity barium titanate powder according to the present invention can be used alone as a filler, but the filler may be used in combination with a known filler(s) such as, for example, amorphous silica powder having a low thermal expansion coefficient, and alumina powder having high thermal conductivity.

Resins that can be used in the resin composition according to the present invention includes epoxy resins; silicone resins; phenol resins; melamine resins; urea resins; unsaturated polyesters; fluororesins; polyamides such as polyimides, polyamideimide and polyetherimide; polyesters such as polybutylene terephthalate and polyethylene terephthalate; poly(phenylene sulfide); aromatic polyesters; polysulfones; liquid crystal polymers; polyethersulfones; polycarbonates; maleimide-modified resins, ABS resins, AAS (acrylonitrile/acrylic rubber/styrene) resins, AES (acrylonitrile/ethylene/propylene/diene rubber/styrene) resins, and the like. These resins can be used alone or in combination of two or more.

Among the resins listed above, the epoxy resin having two or more epoxy groups per molecule is preferred as a resin used as a sealing material for a fingerprint sensor. Example of such an epoxy resin includes phenol novolak type epoxy resins; o-cresol novolak type epoxy resins, epoxidized novolak resins of phenols and aldehydes; glycidyl ethers such as bisphenol A, bisphenol F and bisphenol S; glycidyl ester acid epoxy resins resulting from reaction of polybasic acid such as phthalic acid and dimer acid with epochlorohydrin; linear aliphatic epoxy resins; alicyclic epoxy resins; heterocyclic epoxy resins; alkyl-modified polyfunctional epoxy resins; β-naphthol novolak type epoxy resins; 1,6-dihydroxynaphthalene type epoxy resins; 2,7-dihydroxynaphthalene type epoxy resin; bis-hydroxybiphenyl type epoxy resins; and further, epoxy resins into which halogen such as bromine is introduced in order to impart flame retardancy; and the like. Among them, the o-cresol novolak type epoxy resins, the bis-hydroxybiphenyl type epoxy resins, the epoxy resins having a naphthalene skeleton and the like are suitable in view of moisture resistance and solder reflow resistance.

A curing agent for the epoxy resins is not particularly limited, and known curing agents may be used. Examples of the curing agent for the epoxy resins include novolak type resins such as phenol novolac, cresol novolac, and phenol aralkyl; poly(p-hydroxystyrene) resins; bisphenol compounds such as bisphenol A and bisphenol S; trifunctional phenols such as pyrogallol and phloroglucinol; acid anhydrides such as maleic anhydride, phthalic anhydride and pyromellitic anhydride; aromatic amines such as m-phenylenediamine, diaminodiphenylmethane, and diaminodiphenylsulfone, and the like.

In order to accelerate the reaction of the epoxy resin with the curing agent, a curing accelerator may be added to the resin composition. Examples of the curing accelerator include triphenylphosphine, benzyldimethylamine, 2-methylimidazole and the like.

The resin composition according to the present invention may further contain known additives such as a stress-lowering agent, a silane coupling agent, a surface treatment agent, a flame retardant aid, a flame retardant, a colorant, and a releasing agent. These additives can be used alone or in combination of two or more.

Examples of the stress-lowering agent include rubber substances such as silicone rubbers, polysulfide rubbers, acrylic rubbers, butadiene rubbers, styrene block copolymers and saturated elastomers; various resinous materials such as various thermoplastic resins and silicone resins, resins obtained by modifying a part or all of epoxy resin or phenol resin with aminosilicone, epoxy silicone, alkoxysilicone or the like; and the like.

Examples of the silane coupling agent include epoxy silanes such as γ-glycidoxypropyltrimethoxysilane and β-(3,4-epoxycyclohexyl)ethyltrimethoxysilane;

amino silanes such as aminopropyltriethoxysilane, ureidopropyltriethoxysilane and N-phenylaminopropyltrimethoxysilane; hydrophobic silane compounds such as phenyltrimethoxysilane, methyltrimethoxysilane and octadecyltrimethoxysilane; and mercaptosilanes; and the like.

Examples of the surface treatment agent include Zr chelates, titanate coupling agents, aluminum coupling agents, and the like.

Examples of the flame retardant aid include $Sb_2O_3$, $Sb_2O_4$, $Sb_2O_5$ and the like.

Examples of the flame retardant include halogenated epoxy resins, phosphorus compounds and the like.

Examples of the coloring agent include carbon black, iron oxide, dyes, pigments and the like.

Examples of the releasing agent include natural waxes, synthetic waxes, metal salts of linear fatty acids, acid amides, esters, paraffin, and the like.

The resin composition according to the present invention can be produced by mixing a predetermined amount of each of the above materials with a blender, a Henschel mixer or the like, and then kneading the mixture with a heating roll, a kneader, a single or twin screw extruder or the like, and then cooling the kneaded mixture and then pulverizing it.

The resin composition according to the present invention contains the high-purity barium titanate powder having properties suitable for use as a filler for a sealing material. Therefore, the resin composition can be used as a sealing material that can form a high dielectric constant sealing portion having improved long-term reliability. In particular, since the resin composition according to the present invention can form the high dielectric constant sealing portion, the resin composition is most suitable for use as a sealing material for a fingerprint sensor which requires a high dielectric constant. When the resin composition according to the present invention is used as a sealing material for a fingerprint sensor, the resin composition according to the present invention preferably contains the epoxy resin, the curing agent for the epoxy resin, and the curing accelerator for the epoxy resin.

A fingerprint sensor according to the present invention includes a sealing portion made of a cured product of the resin composition according to the present invention. More particularly, the fingerprint sensor according to the present invention includes at least one chip having at least one sensor portion and at least one sealing portion for sealing the at least one chip.

The at least one chip having the at least one sensor portion is not particularly limited, and at least one chip known in the art may be used.

The sealing portion can be formed by sealing the chip using the resin composition according to the present invention. More particularly, the sealing portion can be formed by forming and curing the resin composition according to the present invention on the chip having the sensor portion. The forming method is not particularly limited, and conventional forming means such as a transfer molding method, a vacuum printing molding method and the like may be used.

The fingerprint sensor according to the present invention includes the sealing portion formed using the sealing material (resin composition) with low viscosity, which can form the high dielectric constant sealing portion having improved long-term reliability. Therefore, the fingerprint sensor has high reliability and high detection accuracy.

EXAMPLES

Hereinafter, the present invention will be described in more detail with reference to Examples and Comparative Examples.

Examples 1 to 12, Comparative Examples 1 to 6

Using an apparatus in which an LPG-oxygen mixing type burner having a double tube structure capable of forming inner and outer flames was installed at a top of a combustion furnace and a collection line having a cyclone and a bag filter was directly connected to a lower portion of the combustion furnace, a barium titanate powder was produced. The formation of flames was carried out by providing several tens of pores at an outlet of the burner having the double pipe structure and injecting a mixed gas of LPG (a supply rate of 5 $m^3$/hr) and oxygen (a supply rate of 30 $m^3$/hr) from the pores. At this time, a barium titanate fine powder raw material having an average particle diameter of from 0.3 to 3 μm was injected at a supply rate of from 2 to 5 kg/hr together with carrier oxygen (a supply rate of from 1 to 5 $m^3$/hr), from a center of the burner.

Here, the average particle diameter of the barium titanate powder was controlled by adjusting the average particle diameter of the barium titanate fine powder raw material. Specifically, when increasing the average particle size of the barium titanate powder, the diameter of the barium titanate fine powder raw material was increased. Conversely, when decreasing the average particle diameter of the barium titanate powder, the diameter of the barium titanate fine powder raw material was decreased.

Further, the average sphericity of the barium titanate powder (in particular, particles having a particle diameter of 2 μm or more) was controlled by adjusting the supply rate of the barium titanate fine powder raw material. Specifically, when increasing the sphericity of the barium titanate powder, the supply rate of the barium titanate fine powder raw material was decreased. Conversely, when decreasing the sphericity of the barium titanate powder, the supply rate of the barium titanate fine powder raw material was increased.

The percentage of the number of particles having a sphericity of more than 0.70 and 0.75 or less and the percentage of the number of particles having a sphericity of 0.70 or less in the barium titanate powder (in particular, particles having a particle diameter of 2 μm or more) was controlled by adjusting the amount of carrier oxygen supplied together with the barium titanate fine powder raw material. Specifically, when increasing the percentage of the number of particles having lower sphericity, the amount of carrier oxygen was decreased. Conversely, when decreasing the percentage of the number of particles with lower sphericity, the amount of carrier oxygen was increased.

It should be noted that in the test, the barium titanate powder recovered by cyclone collection was used.

A high purification treatment was carried out by the following method.

First, the barium titanate powder obtained by cyclone collection and ion exchanged water having an electric conductivity of from 1 to 10 μS/cm were mixed to prepare 1 L of a slurry having a barium titanate powder concentration of 20% by mass, which was then introduced into a SUS container. The slurry in the SUS container was stirred at a rotation speed of 500 rpm using a stirrer "THREE-ONE MOTOR BL 3000 (equipped with φ 38 mm fan stirring blade)" from SHINTO Scientific Co., Ltd. Further, a roller pump "RP-1000" from EYELA was installed in the SUS container to circulate the slurry, and "Ultrasonic Generator UD-200 (equipped with a microchip TP-040)" from TOMY SEIKO CO., LTD. was installed in the circulation line to carry out continuously an ultrasonic dispersing treatment. At this time, an output of the ultrasonic generator was 200 W and a circulation flow rate of the slurry was 0.1 L/min. The slurry circulated for 1 hour was then left for 3 hours, and a supernatant was then removed and dried in a shelf type dryer at 120° C. for 24 hours to obtain high-purity barium titanate powders A to R.

Each of the produced high-purity barium titanate powders was evaluated for the or concentration, the electric conductivity of extracted water and the average particle diameter, as well as the average sphericity of particles having a particle size of 2 μm or more, and the percentage of the number of particles having a sphericity of more than 0.70 and 0.75 or less and the percentage of the number of particles having a sphericity of 0.70 or less. These evaluated results are shown in Tables 1 and 2. It should be noted that each of the crystal compositions of the produced high-purity barium titanate powders A to R had a ratio of tetragon of barium titanate of 80% or more.

TABLE 1

| | | Example | | | | | | | | | | | |
|---|---|---|---|---|---|---|---|---|---|---|---|---|---|
| | | 1 | 2 | 3 | 4 | 5 | 6 | 7 | 8 | 9 | 10 | 11 | 12 |
| Symbol of High-Purity Barium Titanate Powder | | A | B | C | D | E | F | G | H | I | J | K | L |
| High Purification Method Characteristics of Powder | Electrical Conductivity of Ion Exhange Water (μS/cm) | 1 | 5 | 6 | 9 | 6 | 7 | 4 | 4 | 3 | 4 | 10 | 8 |
| | Presence or Absence of Ultrasonic Dispersion | Pr. | Pr. | Pr. | Pr. | Pr. | Pr. | Pr. | Pr. | Pr. | Pr. | Pr. | Pr. |
| | Cl⁻ Concentration (ppm) | 4 | 5 | 20 | 18 | 11 | 12 | 6 | 8 | 6 | 10 | 18 | 15 |
| | Electrical Conductivity of Extracted Water (μS/cm) | 30 | 35 | 65 | 70 | 55 | 60 | 40 | 40 | 30 | 50 | 65 | 60 |
| | Average Particle Diameter (μm) | 20 | 2 | 3 | 25 | 1 | 30 | 10 | 22 | 26 | 21 | 22 | 28 |
| Sphericity of Particles Having Particles Size of 2 μm or more | Average Sphericity (—) | 0.86 | 0.83 | 0.83 | 0.82 | 0.85 | 0.81 | 0.80 | 0.81 | 0.81 | 0.79 | 0.80 | 0.81 |
| | Percentage of Particles Having Sphericity of more than 0.70 and 0.75 or less (%) | 6.5 | 8.0 | 8.5 | 8.0 | 7.0 | 8.5 | 9.5 | 10.0 | 8.5 | 9.5 | 10.5 | 9.0 |

TABLE 1-continued

| | | Example | | | | | | | | | | | |
|---|---|---|---|---|---|---|---|---|---|---|---|---|---|
| | | 1 | 2 | 3 | 4 | 5 | 6 | 7 | 8 | 9 | 10 | 11 | 12 |
| Symbol of High-Purity Barium Titanate Powder | | A | B | C | D | E | F | G | H | I | J | K | L |
| | Percentage of Particles Having Sphericity of 0.70 or less (%) | 3.5 | 6.0 | 7.0 | 6.5 | 3.5 | 7.5 | 9.0 | 9.0 | 10.0 | 9.5 | 9.5 | 10.5 |

TABLE 2

| | | Comparative Example | | | | | |
|---|---|---|---|---|---|---|---|
| | | 1 | 2 | 3 | 4 | 5 | 6 |
| Symbol of High-Purity Barium Titanate Powder | | M | N | O | P | Q | R |
| High Purification Method Characteristics of Powder | Electrical Conductivity of Ion Exhange Water (µS/cm) | 12 | 5 | 5 | 11 | 10 | 12 |
| | Presence or Absence of Ultrasonic Dispersion | Pr. | Pr. | Pr. | Pr. | Pr. | Pr. |
| | Cl⁻ Concentration (ppm) | 20 | 7 | 5 | 17 | 22 | 25 |
| | Electrical Conductivity of Extracted Water (µS/cm) | 75 | 45 | 35 | 75 | 65 | 80 |
| | Average Particle Diameter (µm) | 7 | 0.9 | 32 | 2 | 1 | 25 |
| Sphericity of Particles Having Particles Size of 2 µm or more | Average Sphericity (—) | 0.81 | 0.81 | 0.79 | 0.78 | 0.83 | 0.80 |
| | Percentage of Particles Having Sphericity of more than 0.70 and 0.75 or less (%) | 9.0 | 11.0 | 10.0 | 9.5 | 7.0 | 10.0 |
| | Percentage of Particles Having Sphericity of 0.70 or less (%) | 8.5 | 10.5 | 11.0 | 10.0 | 7.5 | 11.0 |

For evaluating the characteristics of each of the produced high-purity barium titanate powders as a filler for a sealing material, a sealing material (resin composition) was prepared using each of the produced high-purity barium titanate powders.

First, to 2640 g of each of the produced barium titanate powders were added 179 g of a biphenyl type epoxy resin (YX-4000H available from Mitsubishi Chemical Corporation) as an epoxy resin, 156 g of a phenol aralkyl resin (Mirex XLC-4L available from Mitsui Chemicals, Inc.) as a phenol resin, 10 g of epoxy silane (KBM-403 available from Shin-Etsu Chemical Co., Ltd.) as a coupling agent, 7 g of triphenylphosphine (TPP available from Hokko Chemical Industry Co., Ltd.) as a curing accelerator and 8 g of wax (Licowax-E available from CLARIANT), and dry-blended by Henschel mixer ("FM-10B type" from MITSUI MIIKE MACHINERY Co., Ltd.) at 1000 rpm for 1 minute to obtain a mixture. The mixture was then kneaded in a twin-screw extruding kneader with a same direction engaging mechanism (screw diameter D=25 mm; L/D=10.2; a paddle rotation number of from 50 to 120 rpm; a discharging amount of 3.0 kg/hr; a temperature of kneaded material of from 98 to 100° C.). The kneaded material (discharged material) was then pressed by a pressing machine, cooled and then pulverized to obtain a sealing material.

Each of the sealing materials obtained as described above was evaluated for the long-term reliability (high temperature storage characteristics, and Barcol hardness), viscosity characteristic (wire deformation amount) and dielectric property (relative dielectric constant), as follows. The results are shown in Tables 3 and 4.

(1) High Temperature Storage Characteristics

TEG chips (each size of 8 mm×8 mm×0.3 mm) were placed on a BGA substrate (substrate) via a die attach film and connected with eight copper wires. Each of the above sealing materials was then formed on each TEG chip using a transfer molding machine, and then post-cured to prepare 30 simulating chip sealing bodies. Here, the package size was 38 mm×38 mm×1.0 mm, the diameter of each copper wire was 20 pmcp, the pitch was 80 µm, and the space was 60 µm. The transfer molding was carried out under conditions of a mold temperature of 175° C., a molding pressure of 7.5 MPa, a pressure holding time of 90 seconds, and a post cure condition of 175° C. for 8 hours. The 30 simulating chip sealing bodies were storage at 195° C. for 1500 hours, cooled to room temperature, and then measured for the presence or absence of current flow. The number of simulating chip sealing bodies having conduction failures even in one of the eight wires was measured. A smaller number of the conduction failures indicates better high temperature storage characteristics. Specifically, it is preferable that the number of the conduction failures is 3 or less.

(2) Barcol Hardness

Each of the above sealing materials was formed into a disk shape having a diameter of 100 mm and a thickness of 3 mm by means of a transfer molding machine, and a hardness at 10 seconds after opening the mold was measured by a Barcol hardness tester GYZJ 935 model. Here, the transfer molding was carried out under conditions of a mold temperature of 175° C., a molding pressure of 7.5 MPa, and a pressure holding time of 90 seconds. A higher value of the Barcol hardness indicates better curability. Specifically, the Barcol hardness is preferably 60 or more.

(3) Wire Deformation Amount

TEG chips (each size of 8 mm×8 mm×0.3 mm) were placed on a BGA substrate (substrate) via a die attach film and connected with eight copper wires. Each of the above sealing materials was then formed on each TEG chip using a transfer molding machine, and then post-cured to prepare 20 simulating chip sealing bodies. Here, the package size was 38 mm×38 mm×1.0 mm, the diameter of each copper wire was 20 µmφ, the pitch was 80 µm, and the space was 60 µm. The transfer molding was carried out under conditions of a mold temperature of 175° C., a molding pressure of 7.5 MPa, a pressure holding time of 90 seconds, and a post cure condition of 175° C. for 8 hours. Next, for each of the 20 simulating chip sealing bodies, each copper wire portion was observed with a soft X-ray transmission device, and the maximum distance over which each copper wire was moved by packaging (sealing) was measured. An average value of the maximum movement distances of the copper wires in each of the 20 simulating chip sealing bodies was determined to be the wire deformation amount. A smaller value of the wire deformation amount indicates a lower viscosity. Specifically, the wire deformation amount is preferably less than 40 μm.

(4) Relative Dielectric Constant

Each of the above sealing materials was formed into a circular shape having a diameter of 100 mm and a thickness of 3 mm using a transfer molding machine and then post-cured to prepare a cured product of each sealing material. Here, the transfer molding was carried out under conditions of a mold temperature of 175° C., a molding pressure of 7.5 MPa, a pressure holding time of 90 seconds, and a post cure condition of 175° C. for 8 hours. A conductive paste "Dotite D-550" available from FUJIKURA KASEI CO., LTD. was thinly applied onto a surface of the cured product of each sealing material, and an electrostatic capacity was measured at a temperature of 25° C., a humidity of 60% and a frequency of 1 MHz using an LCR meter "HP 4284 A" from Agilent Technologies, Inc. and a measuring electrode "SE-70" from ANDO ELECTRIC CO., LTD. The relative dielectric constant was calculated from the electrostatic capacitance. A larger value of the relative dielectric constant indicates a better dielectric property. Specifically, the relative dielectric constant is preferably 55 or more.

achieve a criterion of a relative dielectric constant of 30 or more, which is required for accurately detecting a sensor of general purpose sensitivity level. When spherical silica or spherical alumina generally used in a sealing material was used as a filler for a sealing material so as to have the same formulation as described above, the results were a relative dielectric constant of a sealing portion formed of a sealing material containing spherical silica of from 3 to 4, and a relative dielectric constant of a sealing portion formed of a sealing material containing spherical alumina of from 6 to 7. Therefore, the use of the high-purity barium titanate powder according to the present invention could provide good dielectric characteristics which could not be achieved by conventional fillers.

Based on the above results, the present invention can provide a barium titanate powder capable of producing a sealing material with low viscosity, which can form a high dielectric constant sealing portion having improved long-term reliability and a method for producing the same. Further, the present invention can provide a resin composition suitable for use as a sealing material with low viscosity, which can form a high dielectric constant sealing portion having improved long-term reliability. Furthermore, the present invention can provide a fingerprint sensor having improved long-term reliability and high detection accuracy.

INDUSTRIAL APPLICABILITY

The high-purity barium titanate powder according to the present invention can be used as a filler used for a sealing material for protecting various electronic parts in electronic component devices. In particular, the high-purity barium

TABLE 3

| | | Example | | | | | | | | | | | |
|---|---|---|---|---|---|---|---|---|---|---|---|---|---|
| | | 1 | 2 | 3 | 4 | 5 | 6 | 7 | 8 | 9 | 10 | 11 | 12 |
| Symbol of High-Purity Barium Titanate Powder | | A | B | C | D | E | F | G | H | I | J | K | L |
| Characteristics of Sealing Material | High Temperature Storage Characteristics/Conduction Failure (Number) | 0 | 0 | 3 | 2 | 2 | 2 | 1 | 1 | 1 | 1 | 3 | 2 |
| | Barcol Hardness (—) | 68 | 65 | 62 | 61 | 62 | 62 | 64 | 65 | 67 | 64 | 62 | 61 |
| | Wire Deformation Amount (μm) | 18 | 21 | 19 | 22 | 26 | 28 | 25 | 27 | 28 | 32 | 31 | 33 |
| | Relative Dielectric Constant (—) | 58 | 55 | 55 | 59 | 55 | 59 | 57 | 58 | 58 | 57 | 57 | 59 |

TABLE 4

| | | Comparative Example | | | | | |
|---|---|---|---|---|---|---|---|
| Symbol of High-Purity Barium Titanate Powder | | 1 | 2 | 3 | 4 | 5 | 6 |
| | | M | N | O | P | Q | R |
| Characteristics of Sealing Material | High Temperature Storage Characteristics/Conduction Failure (Number) | 3 | 1 | 0 | 2 | 5 | 5 |
| | Barcol Hardness (—) | 55 | 64 | 65 | 55 | 61 | 52 |
| | Wire Deformation Amount (μm) | 23 | 48 | 44 | 30 | 25 | 32 |
| | Relative Dielectric Constant (—) | 56 | 55 | 58 | 58 | 55 | 58 |

As being clear from the comparison of Examples with Comparative Examples, according to the present invention, a resin composition (sealing material) having low viscosity and good curability could be obtained. Further, this resin composition could form a cured product (sealing portion) having good high temperature storage characteristics and improved long-term reliability. Furthermore, this resin composition could form a cured product (sealing portion) having a relative dielectric constant of from 55 to 59, and could titanate powder according to the present invention can be used as a filler used for a sealing material for protecting a fingerprint sensor for mobile terminals represented by smartphones and tablets.

What is claimed is:

1. A resin composition for a sealing material, said resin composition comprising a high-purity barium titanate powder having a Cl⁻ concentration of 20 ppm or less, an electric conductivity of extracted water of 50 μS/cm or less, and an average particle diameter of 1 μm to 30 μm, wherein the resin composition is useable as a sealing material, and wherein any particles of the high-purity barium titanate powder having a particle diameter of 2 μm or more satisfy the following conditions (A) to (C):

(A) an average sphericity is 0.80 or more;
(B) a percentage of a number of particles having a sphericity of more than 0.70 and 0.75 or less is 6.5% to 10.0%; and
(C) a percentage of a number of particles having a sphericity of 0.70 or less is 3.5% to 10.0%.

2. A fingerprint sensor comprising at least one sealing portion made of a cured product of the resin composition according to claim 1.

3. The resin composition according to claim 1, having a Barcol hardness of at least 60 and a wire deformation amount less than 40 μm.

4. A fingerprint sensor comprising at least one sealing portion made of a cured product of the resin composition according to claim 3.

* * * * *